July 15, 1958   R. B. BILLIG ET AL   2,843,440
Two part cake tin
Filed July 19, 1956
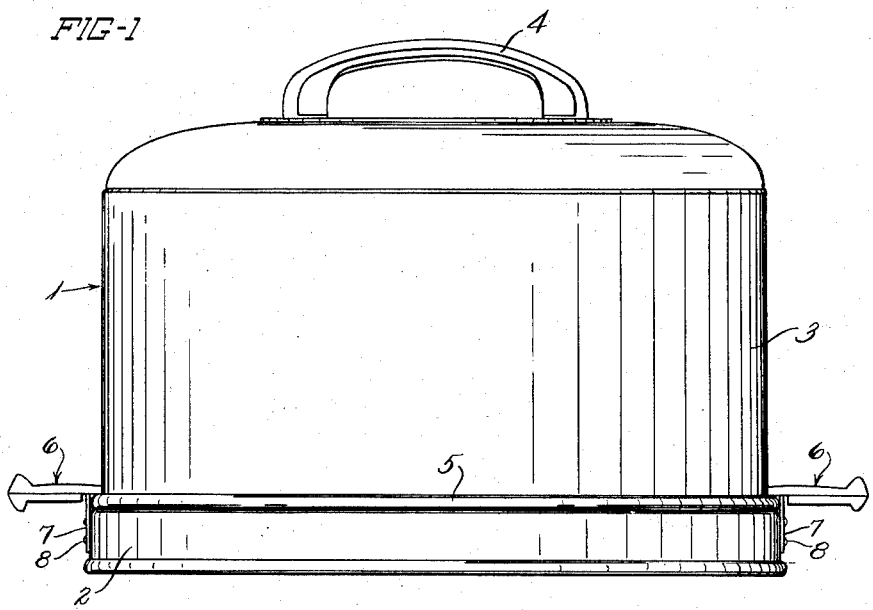
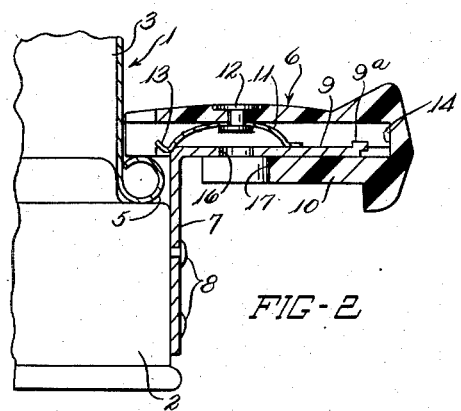
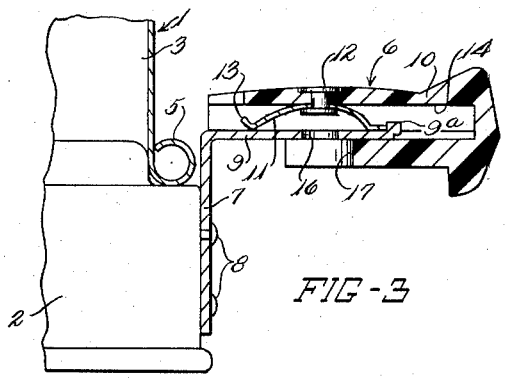
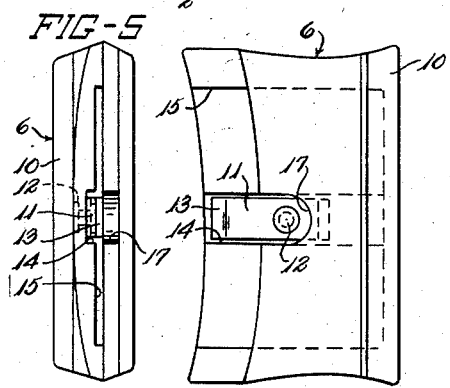
INVENTORS
RALPH B. BILLIG
MANUEL S. ZISKIN
BY Oldham & Oldham
ATTYS.

United States Patent Office 2,843,440
Patented July 15, 1958

2,843,440

TWO PART CAKE TIN

Ralph B. Billig, Westlake, and Manuel S. Ziskin, Mayfield, Ohio, assignors to Kromex, Inc., Cleveland, Ohio, a corporation of Ohio Application July 19, 1956, Serial No. 598,807

4 Claims. (Cl. 312—284)

This invention relates to cake tins, carriers or the like, and particularly is concerned with a two-part cake tin having a removable cover member adapted to be secured to a cake tin base member or plate and cover any cake thereon and also serve as a convenient means for carrying the assembled cake receiving article.

Heretofore there have been many different structures provided for covering cakes, or the like. These cake tins or carriers have frequently comprised two members wherein one is a base plate on which a cake is supported and the second member is some type of a large cup shaped cover that will seal on the cake base plate and enclose any normal size cake thereon. Lock means of various types have been provided for securing the cover to the base member in some of these prior structures. These lock or securing means have been of various degrees of effectiveness, complexity and cost. Some may have functioned satisfactorily in service whereas others have not been foolproof in action and have released the two-part assembly unexpectedly or may have been objectionable for any of a number of reasons. Naturally, it is necessary that these cake tins or carriers must be easy to keep clean, they must be attractive in appearance, they must give an effective service life, and they should be easy to operate and be inexpensive in construction.

The general object of the present invention is to provide an improved type of a two-part cake tin, or carrier, characterized by the novel, attractive appearance of article and by the useful, easily operated locking means provided for securing the two-part cake tin in assembled relationship.

Another object of the invention is to provide positive acting, slidable handle means adapted to be locked in operative position for securing a cover to a cake tin base member.

Yet another object of the invention is to use a spring member in a pair of diametrically opposed handle means provided on a cake base plate wherein such handle means and spring member thereon limit the motion of the handle means from an operative secured position over to a second released position where the handle means still are operative for support of the cake base plate.

Another object of the invention is to provide a handle assembly on a cake tin base plate wherein the handle and its components can be readily washed and kept in a clean, sanitary condition, and where the handle components are adapted to give an effective service life.

A further object of the invention is to provide a self-locking handle assembly which can be made up as a sub-assembly and slipped on to the carrier bracket with the self-locking means resisting removal therefrom under normal force.

The foregoing and other objects and advantages of the invention will be made more apparent as this specification proceeds.

For a better understanding of the invention, reference should be had to the accompanying drawings which illustrate one currently preferred embodiment of the invention, and wherein:

Fig. 1 is a side elevation of a cake tin or carrier of the invention;

Fig. 2 is an enlarged fragmentary vertical section of a handle on the base plate and associated portion of the cake plate cover;

Fig. 3 is a fragmentary vertical section like Fig. 2 only with the handle moved to its released position with relation to the cover member;

Fig. 4 is a bottom plan of the handle sub-assembly;

Fig. 5 is an end view of the handle sub-assembly, looking at the open end; and

Fig. 6 is a perspective view of a suitable carrier bracket.

When referring to corresponding parts shown in the drawings and referred to in the specification, corresponding numerals are used to facilitate comparison therebetween.

The present invention, broadly speaking, relates to a cake tin, carrier or the like, wherein a base member is provided, a cake cover member is present, a handle is present on the cover member, the cover member having an outwardly protruding lower edge bead, and a pair of opposed handle means are present on the base member. As a further portion of the invention, the handle means each include a carrier bracket secured to the base member and including a flat section extending outwardly from the base member, a handle slidably and permanently engaged with the flat section of the carrier bracket and having a cover member engaging position, and a spring secured to the handle and engaging the carrier bracket to resiliently engage a corner edge of the carrier bracket for retaining the handle resiliently in cover member engaging position. The handle in its cover member engaging position locks over the edge bead on the cover member for retaining the cover on the base when both handles are in their engaging positions.

It will be realized that the base and the cover of the cake carrier may be made from any suitable material, and usually are made from metallic material.

In order to understand the invention completely, attention now is directed to the details of the structure shown in the accompanying drawings. Fig. 1 shows a cake tin, or carrier 1 comprising a base or base plate 2 and a generally cup-shaped cover member, or cover 3 adapted to fit upon the base 2 and to cover or enclose any normal size cake or similar article thereupon.

The cover 3 has a handle 4 provided thereon to facilitate carrying the assembled cake tin or carrier 1. A bead 5 is usually formed integrally with the cover 3 at the lower edge thereof for a purpose to be described hereinafter in detail.

When desired, the base 2 and any article thereon can be carried around separately without use of the cover 3. To this end, a pair of diametrically opposed handle means indicated as a whole by the numeral 6 are provided on this base 2. Each of these handle means, or units includes, usually, a separate carrier bracket 7 secured, as by rivets 8, to the base 2 on opposed peripheral portions thereof and extending outwardly therefrom. These carrier brackets 7 have flat sections 9 at the top portion thereof extending outwardly of the cake carrier base 2. A handle 10 is engaged with each of the flat sections 9, or is otherwise slidably carried by the base 2, and at all times will serve to facilitate carrying the base 2 with any desired member or article thereon. Such handles 10 are carried by the flat sections of the carrier bracket or brackets and have an operative position in which they engage a portion of the cover 3 and have a released position in relation to such cover 3. To this end, each of the handles 10 has a member such as a leaf spring 11 secured thereto, as by rivet 12 or a similar member, which spring also limits the movement of the handles.

Figs. 2 and 3 of the drawings best show the action of this leaf spring 11 in controlling and limiting the sliding movement for the handles 10. Fig. 2 shows how one end of the leaf spring 11, which may have an upwardly turned end section 13 thereon, extends over and resiliently engages a corner on the carrier bracket 7 at the inner edge of the flat section 9 so that the handle 10 is resiliently held in such operative or locking position. Thus the handles 10 will engage the bead 5, or other suitable means on the cover 3 and hold the base and cover of the cake carrier tightly together for unitary carrying action thereof.

However, when the cover is to be released, a slight outward sliding pressure exerted upon the handles 10 will pull the spring ends up over the corners of the carrier brackets. In order to limit movement of the handles 10 outwardly of the base 2, a little lip or flange 9a is formed on the carrier bracket 7 at the outer end thereof and extends upwardly therefrom. The outer end of the leaf spring 11 thus abuts against such edge flange 9a and limits the sliding movement of the handle on the carrier bracket.

Preferably the handles 10 are formed from a plastic material of attractive color and design and these handles have top and bottom portions that completely enclose the flat section 9 of the carrier bracket and present an attractive carrier means for the cake tin, or carrier in the article of the invention.

Preferably a slot or elongated recess 14 is provided in the upper surface of the elongate or flat aperture 15 provided in the handle 10 which receives the flat section 9 of the carrier bracket 7 therein. Such slot 14 aids in the retention of the leaf spring 11 in desired operative position and help hold the handle 10 snugly in engagement with the carrier bracket 7 in all operative positions of the handle 10.

The handle 10, spring 11, and rivet 12 may form a sub-assembly, as shown in Figs. 4 and 5. A cut-out portion 17, in the lower section of the handle 10 is provided to permit easy access for assembly and upsetting of the rivet 12. In assembly, the handle sub-assembly is pushed on to the flat section 9 of the carrier bracket 7 with the upturned portion 13 of the spring 11 permitting the spring to ride over the lip 9a. After the trailing edge of the spring has passed over the lip 9a, the handle is securely locked against removal. The hole 16 in section 9 of the bracket is usually provided as a maintenance convenience. In case of damaged handles, the hole 16 permits the drilling out of the rivet 12, for removal of the handle sub-assembly. However, the hole 16 might also be used for access to the rivet in assembling the handle directly onto the carrier bracket.

It should be noted that any suitable carrier brackets may be provided for positioning the handles 10. Such brackets may be integral with the base 2 if desired.

The various portions of the cake tin or carrier 1 can be readily washed and be kept in a clean and sanitary condition. Furthermore, the components of the handle are of attractive appearance and can be subjected to ordinary washing conditions without any possibility of rust or injury to the components thereof. The handle means are positive in operation and can be readily moved by any person using the cake tin so as to have the handles maintain either operative or inoperative positions and be retained in such positions for any desired length of time. Hence it is believed that the objects of the invention have been achieved.

While one representative embodiment of the invention has been illustrated and described herein, it will be understood that other modifications may be made to the invention without departing from the scope thereof as defined in the attached claims.

What is claimed is:
1. In a cake tin, carrier, or the like, a base member, a cake cover member, a handle on said cover member, said cover member having an outwardly protruding lower edge bead, and a pair of opposed handle means on said base member; each of said handle means including a carrier bracket secured to said base member and including a flat section extending outwardly from said base member, a handle slidably engaged with the flat section of said carrier bracket and having a cover member engaging position, and a leaf spring secured intermediate its ends to said handle and engaging said carrier bracket at an end of said spring, said spring at its other end resiliently engaging a corner edge of said carrier bracket to retain said handle resiliently in cover member engaging position, said handle in cover member engaging position engaging said edge bead on said cover member to retain it on said base member when both of said handle means are in their engaging positions.

2. In a cake tin, carrier, or the like, a base member, a cover member, and a pair of diametrically opposed handle means on said base member, each of said handle means including a carrier bracket secured to said base member and including a section extending outwardly from said base member, a handle slidably engaged with said section of said carrier bracket and having a closed cover-engaging position and a released position, a leaf spring secured to said handle and having spaced portions engaging said carrier bracket, one portion of said spring resiliently engaging a corner edge of said carrier bracket to urge said handle to retain its closed position, said handles in closed position engaging said cover member to retain it on said base member, said section of each of said carrier brackets having a stop rib thereon, the other portion of said leaf spring engaging said stop rib to limit the movement of said handle on said section and define the released positions thereof.

3. In a cake tin, carrier or the like, a base, a cover for said base, a carrier bracket at each of two diametrically opposed portions of said base member each having an outwardly directed portion, a handle having a flat aperture therein slidably carried by the outwardly directed portion of each of said carrier brackets, a leaf spring, and means securing said spring intermediate its ends to said handle to extend radially of said base, said handles being movable radially inwardly on said outwardly directed portion of said carrier brackets to engage said cover when on said base, said leaf springs engaging parts of said carrier brackets to retain said handles resiliently in their cover engaging positions, said handle having a recess therein in which said spring is positioned, said handle having an aperture in a lower portion thereof on the axis of said securing means to provide access to both ends of said securing means which extend through said leaf spring and an upper portion of said handle to said flat aperture.

4. A cake tin as in claim 3 wherein said carrier bracket has protruding stop means at an outer portion thereof, and an outer end of said spring engages said stop means to resist removal of said handle from said carrier bracket.

References Cited in the file of this patent

UNITED STATES PATENTS

| 24,764 | Shaler | July 12, 1859 |
| 900,952 | Quackenboss et al. | Oct. 13, 1908 |
| 2,250,709 | Hummel | July 29, 1941 |
| 2,758,458 | Carlson | Aug. 14, 1956 |

FOREIGN PATENTS

| 31,579 | Austria | Jan. 25, 1908 |
| 317,698 | France | May 31, 1902 |